United States Patent
Tsimhoni et al.

(10) Patent No.: US 10,625,676 B1
(45) Date of Patent: Apr. 21, 2020

(54) INTERACTIVE DRIVING SYSTEM AND METHOD

(71) Applicant: GM GLOBAL TECHNOLOGY OPERATIONS LLC, Detroit, MI (US)

(72) Inventors: Omer Tsimhoni, Bloomfield Hills, MI (US); Gila Kamhi, Zichron Yaakov (IL); Ariel Telpaz, Herzliya (IL); Ron M. Hecht, Raanana (IL); Asaf Degani, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/207,454

(22) Filed: Dec. 3, 2018

(51) Int. Cl.
| | |
|---|---|
| *B60R 1/00* | (2006.01) |
| *H04N 5/445* | (2011.01) |
| *G09B 9/04* | (2006.01) |
| *A63F 13/25* | (2014.01) |
| *G05D 1/00* | (2006.01) |

(52) U.S. Cl.
CPC .............. *B60R 1/00* (2013.01); *A63F 13/25* (2014.09); *G05D 1/0088* (2013.01); *G09B 9/04* (2013.01); *H04N 5/44504* (2013.01); *A63F 2300/80* (2013.01); *B60R 2300/105* (2013.01); *B60R 2300/207* (2013.01); *B60R 2300/303* (2013.01); *G05D 2201/0213* (2013.01)

(58) Field of Classification Search
CPC .............. B60R 1/00; B60R 2300/105; B60R 2300/207; B60R 2300/303; A63F 13/25; A63F 2300/80; G05D 1/0088; G05D 2201/0213; G09B 9/04; H04N 5/44504
USPC .......................................................... 463/31
See application file for complete search history.

(56) References Cited

U.S. PATENT DOCUMENTS

| | | | |
|---|---|---|---|
| 2013/0083061 A1* | 4/2013 | Mishra ................... | H04N 5/265 345/633 |
| 2016/0321940 A1* | 11/2016 | Banga ...................... | G09B 9/05 |
| 2017/0103571 A1* | 4/2017 | Beaurepaire ........ | G01C 21/3667 |
| 2018/0040163 A1* | 2/2018 | Donnelly ................ | G06F 3/012 |
| 2018/0118219 A1* | 5/2018 | Hiei ....................... | B60W 40/09 |

* cited by examiner

*Primary Examiner* — Allen Chan
(74) *Attorney, Agent, or Firm* — Reising Ethington, P.C.

(57) ABSTRACT

An interactive driving system and method that improves a driving experience by allowing a passenger to interactively monitor and evaluate certain driving maneuvers in real-time with an augmented reality interface. The input provided by the passenger via the augmented reality interface is recorded for later processing and analysis. For instance, the passenger input may be used to generate driving reports for later review by the driver and passenger (e.g., when the passenger is teaching a new driver how to drive) or for the manufacturer of autonomous or semi-autonomous vehicles (e.g., when the manufacturer is seeking actionable feedback for improving various self-driving algorithms). In addition, the interactive driving system and method entertain the passenger with the augmented reality interface, which can be delivered in a game-like fashion via a computer program product installed on their own personal electronic device (e.g., a tablet, phone, laptop, etc.).

19 Claims, 4 Drawing Sheets

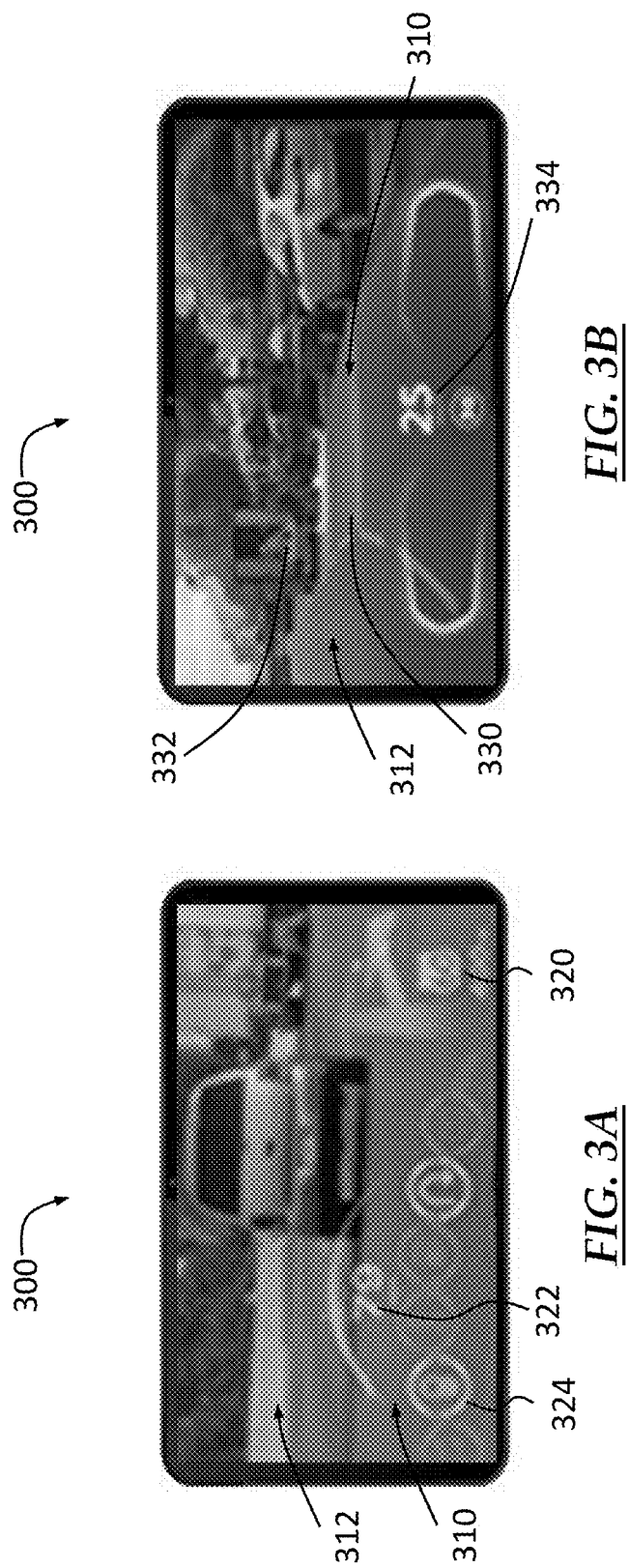

INTERACTIVE DRIVING SYSTEM AND METHOD

TECHNICAL FIELD

The exemplary embodiments described herein generally relate to an interactive driving system and method and, more particularly, to an interactive driving system and method for monitoring, evaluating and/or improving a driving experience via an augmented reality interface.

INTRODUCTION

Improving the driving experience, in terms of safety, comfort and/or entertainment, is a common objective for automotive manufacturers and users alike.

There are many times, for example, when a driver initiates a braking or steering maneuver too early or too late such that the driving experience is made less comfortable for passengers in the vehicle. At the same time, passengers are increasingly looking for new and interactive ways to be entertained while driving and, in some instances, to exert more control over the driving experience. These interrelated issues can sometimes produce tension between the driver and passengers that takes away from or in some way diminishes the driving experience.

The interactive driving system and method disclosed herein are designed to address these issues.

SUMMARY

According to one aspect, there is provided an interactive driving method for use with a vehicle having one or more vehicle camera(s) and one or more vehicle sensor(s), the method may comprise the steps: gathering vehicle video data with the vehicle camera(s); gathering vehicle sensor data with the vehicle sensor(s); sending the vehicle video data and the vehicle sensor data from the vehicle to a personal electronics device; creating an augmented reality interface using the vehicle video data and the vehicle sensor data, the augmented reality interface gives a passenger a sense of the driving conditions currently being experienced; receiving passenger input via the augmented reality interface; and saving the passenger input.

According to various embodiments, the interactive driving method may further include any one of the following features or any technically-feasible combination of some or all of these features:
- a vehicle video data gathering step that further comprises gathering vehicle video data in the form of forward-looking video footage, the forward-looking video footage captures an area in front of the vehicle and is representative of an actual scene or set of conditions being experienced by a driver;
- a vehicle sensor data gathering step that further comprises gathering vehicle sensor data in the form of vehicle dynamics sensor data that can be used to enhance the augmented reality interface, the vehicle dynamics sensor data is selected from a list consisting of: a vehicle location, a vehicle speed, a vehicle acceleration, or a vehicle stability reading;
- a vehicle sensor data gathering step that further comprises gathering vehicle sensor data in the form of vehicle external sensor data that can be used to enhance the augmented reality interface, the vehicle external sensor data is selected from a list consisting of: a relative distance, a relative speed, or a relative acceleration between the vehicle and another vehicle or object;
- a sending step that further comprises sending the vehicle video data and the vehicle sensor data from a vehicle communications module on the vehicle to the personal electronics device over a short range wireless link;
- a sending step that further comprises sending the vehicle video data and the vehicle sensor data from a vehicle communications module on the vehicle to a cloud-based facility over a long range wireless link, and then sending the vehicle video data and the vehicle sensor data from the cloud-based facility to the personal electronics device over a long range wireless link.
- a creating step that further comprises creating the augmented reality interface by overlaying or superimposing the vehicle sensor data on top of the vehicle video data;
- vehicle sensor data that includes vehicle dynamics sensor information, the vehicle video data includes actual video footage of an area in front of the vehicle, and the vehicle sensor data is overlaid or superimposed on the vehicle video data so that the augmented reality interface presents both the vehicle sensor data and the vehicle video data to the passenger at the same time;
- vehicle sensor data that includes vehicle external sensor information, the vehicle video data includes actual video footage of an area in front of the vehicle, and the vehicle sensor data is animated so that the augmented reality interface presents both the vehicle sensor data and the vehicle video data to the passenger in a way that changes with an urgency of the driving conditions being experienced by a driver;
- animated vehicle sensor data that includes at least one of a changing color or a changing graphic to convey the urgency of the driving conditions being experienced by a driver;
- a creating step that further comprises using a computer program product configured for installation on the personal electronics device to create the augmented reality interface, the computer program product includes electronic instructions that, when executed by the personal electronics device, cause the personal electronics device to present the augmented reality interface to the passenger via a screen or display on the personal electronics device;
- a receiving step that further comprises receiving passenger input via the augmented reality interface in the form of predetermined positive and negative indicators, a positive indicator represents a positive evaluation of a driving maneuver by the passenger and a negative indicator represents a negative evaluation of a driving maneuver by the passenger;
- a receiving step that further comprises determining an amount of time between the driving maneuver and the passenger inputting the predetermined positive and negative indicators, and using the amount of time as a temporal-based factor to assign the predetermined positive and negative indicators to the driving maneuver;
- a receiving step that further comprises determining a relationship on a screen of the personal electronics device between a location where the driving maneuver occurs and a location where the passenger inputs the predetermined positive and negative indicators, and using the relationship as a location-based factor to assign the predetermined positive and negative indicators to the driving maneuver;

a saving step that further comprises saving the passenger input along with contemporaneous vehicle video data and vehicle sensor data;
generating a driving report from the saved passenger input;
a driving report that includes a post-trip driving report for the passenger and driver to review together, the post-trip driving report includes at least one of a safety score or a comfort score;
a driving report that includes one or more saved example (s) of actual driving maneuvers, the saved example(s) include at least one of saved video footage, a saved camera image, or saved vehicle sensor data;
a driving report that includes feedback for an autonomous driving system, and a method that further comprises the step of: making adjustments or calibrations to autonomous driving algorithms based on the saved passenger input in the driving report;
an augmented reality interface is in a game mode, and a method that further comprises the step of: scoring the passenger based on virtual driving decisions that are part of the passenger input;
a game mode that includes a simulation feature, and a method that further comprises the step of: presenting one or more hypothetical obstacles or scenarios to the passenger via the augmented reality interface that are not actually being experienced by a driver;
According to another aspect, there is provided an interactive driving system for use with a vehicle, comprising: one or more vehicle camera(s) that are mounted on the vehicle and provide vehicle video data; one or more vehicle sensor (s) that are mounted on the vehicle and provide vehicle sensor data; a vehicle data processing module that is mounted on the vehicle and is coupled to the vehicle camera(s) to receive the vehicle video data and is coupled to the vehicle senor(s) to receive the vehicle sensor data; a vehicle communications module that is mounted on the vehicle and is coupled to the vehicle data processing module, the vehicle communications module is configured to send the vehicle video data and the vehicle sensor data to a personal electronics device; and a computer program product configured for installation on the personal electronics device, wherein the computer program product includes electronic instructions that, when executed by the personal electronics device, cause the personal electronics device to perform the following steps: creating an augmented reality interface using the vehicle video data and the vehicle sensor data, the augmented reality interface gives a passenger a sense of the driving conditions currently being experienced; receiving passenger input via the augmented reality interface; and saving the passenger input.

BRIEF DESCRIPTION OF THE DRAWINGS

One or more exemplary embodiments will hereinafter be described in conjunction with the appended drawings, wherein like designations denote like elements, and wherein:
FIGS. 3A-3B are screen shots illustrating examples of an augmented realty interface that may be generated by the interactive driving method of FIG. 2.

DETAILED DESCRIPTION OF THE ILLUSTRATED EMBODIMENT(S)

The interactive driving system and method described herein are designed to improve a driving experience in terms of safety, comfort and/or entertainment by allowing a passenger to interactively monitor and critique certain driving maneuvers with an augmented reality interface. The input provided by the passenger via the augmented reality interface is recorded, along with contemporaneous vehicle and external data, for later processing and analysis that can be used to improve the driving experience. For example, the passenger input may be used to generate driving reports for later review by the driver and passenger (e.g., when a passenger is training a new driver or teaching a driver to drive more safely), or to generate driving reports for the manufacturer of autonomous or semi-autonomous vehicles (e.g., in the form of actionable feedback that can then be used to improve the various algorithms employed by the manufacturer). Of course, there are many other potential uses for the passenger input, as the preceding examples represent just a few of the possibilities. In addition to gathering potentially valuable input from the passenger, the interactive driving system and method entertain the passenger and give him or her a sense of control through the use of the augmented reality interface, which can be delivered via a computer program product installed on their own personal electronic device (e.g., a tablet, phone, laptop, etc.).

Figure 1:
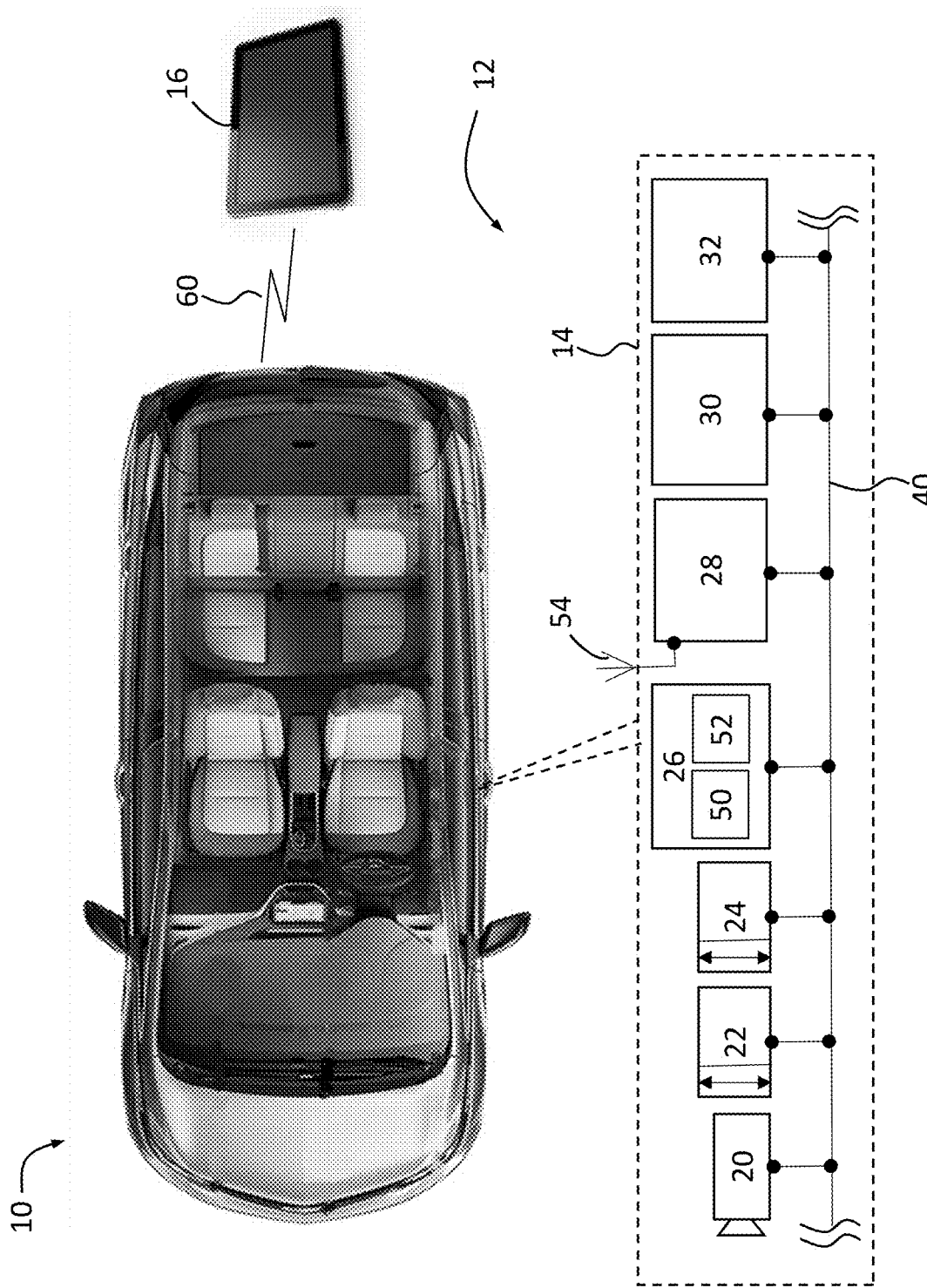
FIG. 1 is a schematic block diagram of an embodiment of an interactive driving system installed on a vehicle and a personal electronic device.

Turning now to FIG. 1, there is shown an example of a vehicle 10 having an interactive driving system 12 for improving a driving experience, where the system is capable of carrying out the interactive driving method described below. According to this example, system 12 includes vehicle hardware 14 having one or more vehicle camera(s) 20, one or more vehicle sensor(s) 22, 24, a vehicle data processing module 26, a vehicle communications module 28, a vehicle autonomous driving module 30, other vehicle electronic modules 32, as well as any other suitable combination of systems, modules, devices, components, hardware, software, etc. that are needed to carry out the method, steps and/or functionality described herein. The various components of the vehicle hardware 14 may be connected by a vehicle communication network 40 (e.g., a wired vehicle communications bus, a wireless vehicle communications network, or some other suitable communications network) and are designed to communicate with a passenger's personal electronic device 16. Vehicle 10 may be a traditional non-autonomous vehicle or an autonomous or semi-autonomous vehicle. The phrase "autonomous or semi-autonomous vehicles," as well as any derivative terms, broadly means any vehicle capable of automatically performing a driving-related action or function, without a driver request, and includes actions falling within levels 1-5 of the Society of Automotive Engineers (SAE) International classification system.

Skilled artisans will appreciate that the schematic block diagram of the vehicle hardware 14 is simply meant to illustrate some of the more relevant hardware components used with the present method and it is not meant to be an exact or exhaustive representation of the vehicle hardware that would typically be found on such a vehicle. Furthermore, the structure or architecture of the vehicle hardware 14 may vary substantially from that illustrated in FIG. 1 (e.g., camera 20, sensors 22, 24 and/or modules 26-32 could be integrated or otherwise combined with one other, as opposed to all being separate stand-alone components). Because of the countless number of potential arrangements and for the sake of brevity and clarity, the vehicle hardware 14 is described in conjunction with the illustrated embodiment of FIG. 1, but it should be appreciated that the present system and method are not limited to such.

Vehicle camera(s) 20 are mounted on vehicle 10 and may include any suitable camera known or used in the industry. Although the following examples describe the vehicle camera 20 in the context of a video or still camera that generates corresponding images, vehicle camera 20 may include radar-based, lidar-based, ultrasonic-based and/or other types of vision systems in addition to or in lieu of traditional cameras. Thus, vehicle camera 20 is not limited to any particular kind of vehicle vision system, so long as it is capable of gathering images, representations and/or other information regarding the environment around the vehicle. According to a non-limiting example, the vehicle hardware 14 includes a collection of CMOS cameras or image sensors 20 located around the vehicle, including one or more forward-facing CMOS cameras that provide digital images that can be subsequently stitched together to yield a 2D or 3D representation of the road and environment in front and/or to the side of the vehicle. The vehicle camera 20 may provide vehicle video data to one or more components of the vehicle hardware 14, including the vehicle data processing module 26. Depending on the particular application, the vehicle camera 20 may include: a still camera, a video camera, a radar unit, a lidar unit and/or some other type of image generating device; a BW and/or a color camera; a front-, rear- side- and/or 360°-facing camera; part of a mono and/or stereo system; an analog and/or digital camera; a short-, mid- and/or long-range camera; and a wide and/or narrow FOV (aperture angle) camera, to cite a few possibilities. In one example, the vehicle camera 20 outputs raw vehicle video data (i.e., with no or little pre-processing), whereas in other examples the vehicle camera 20 includes image processing resources and performs pre-processing on the captured images before outputting them as vehicle video data.

Vehicle sensor(s) 22, 24 are mounted on vehicle 10 and may include any suitable sensor type known or used in the industry. Although the following examples describe sensor 22 in the context of a vehicle dynamics sensor and sensor 24 in the context of a vehicle external sensor, it should be appreciated that these are just examples. Thus, vehicle sensors 22, 24 are not limited to any particular kind of sensor or equipment. According to a non-limiting example, sensor 22 is a vehicle dynamics sensor that provides system 12 with information regarding the location, the speed, the acceleration, and/or the stability of the vehicle (e.g., wheel slippage, loss of traction), regarding the activation or status of certain equipment or features (e.g., turn signals, headlight high beams, Advanced Driver Assistance Systems (ADAS) like those for lane departure, forward collision, adaptive cruise control, etc.) and/or regarding some other operating parameter of the vehicle 10. For instance, vehicle sensor 22 may output vehicle sensor data in the form of vehicle location information (e.g., GPS coordinates) and/or vehicle speed information at the same time that vehicle camera 20 is outputting vehicle video data so that images from the camera can be correlated to the particular location and/or speed of the vehicle at that time.

Sensor 44, on the other hand, may be a vehicle external sensor that provides system 12 with information regarding the relative distance or gap, the relative speed, the relative acceleration and/or some other parameter pertaining to an object or vehicle in the road. For example, vehicle sensor 24 can output vehicle sensor data in the form of a distance or gap, a speed differential and/or an acceleration differential between vehicle 10 and one or more leading vehicles located ahead of vehicle 10. By providing this vehicle sensor data at the same time that vehicle camera 20 is outputting vehicle video data, the system is able to correlate or connect the images from the camera to the relative status of the vehicles around vehicle 10 at that time. The correlation between vehicle sensor data and vehicle video data mentioned in this paragraph may be useful during later processing and analysis, so that driving maneuvers can be evaluated in the context of the circumstances that were being experienced at that time. Some non-limiting examples of vehicle sensor 24 include a radar unit, a lidar unit, other types of image generating devices, or a combination thereof.

Of course, sensors 22, 24 may include other types of sensors as well, including those that sense outside or environmental conditions (e.g., temperature, precipitation, nighttime/daytime conditions, etc.), road conditions (e.g., the type of road surface, a bend or curve in the road, a fork in the road, posted speed limit, etc.), traffic conditions, etc. By contemporaneously gathering various types of vehicle sensor data, along with the vehicle video data, system 12 will be better able to assess or evaluate the driving maneuvers and other decisions made by the driver at a later time, as will explained.

Vehicle data processing module 26, vehicle communications module 28, vehicle autonomous driving module 30, as well as the other vehicle electronic modules 32 may include any suitable components and be arranged according to any suitable configurations known or used in the industry. Because the particular architectures of modules 26-32 are not critical and because these modules can be provided according to so many different embodiments, the following description of components of module 26 can apply to any of the modules 26-32, except for where stated otherwise. For instance, each of the modules 26-32 may include one or more processing device(s) 50, memory device(s) 52, I/O device(s), as well as any other hardware and/or software typically found on such modules. The processing device 50 can be any type of device capable of processing electronic instructions including microprocessors, microcontrollers, host processors, controllers, vehicle communication processors, General Processing Unit (GPU), accelerators, Field Programmable Gated Arrays (FPGA), and Application Specific Integrated Circuits (ASICs), to cite a few possibilities. It can be a dedicated processor used only for module 26 or can be shared with other vehicle systems, modules, devices, components, etc. The processing device 50 can execute various types of electronic instructions, such as software and/or firmware programs stored in the memory device 52, which enable the module 26 to carry out various functionality. The memory device 52 can be a non-transitory computer-readable medium; these include different types of random-access memory (RAM), including various types of dynamic RAM (DRAM) and static RAM (SRAM)), read-only memory (ROM), solid-state drives (SSDs) (including other solid-state storage such as solid state hybrid drives (SSHDs)), hard disk drives (HDDs), magnetic or optical disc drives, or other suitable computer medium that electronically stores information. In one example, the processing device 50 executes programs or processes data and the memory device 52 stores programs or other data in order to help carry out or support at least a part of the present method.

Vehicle data processing module 26 receives vehicle video data and vehicle sensor data from vehicle camera 20 and vehicle sensors 22, 24, respectively, and may be configured to process, compress and/or otherwise prepare such data before sending it to the personal electronic device 16 where such data can be used to create an augmented reality interface, as explained below. Vehicle data processing module 26 may be indirectly or directly connected to the vehicle camera 20 and vehicle sensors 22, 24, as well as any combination of the other modules 28-32 (e.g., via vehicle communications network 40). It is possible for the vehicle data processing module 26 to be integrated or combined with the vehicle camera 20 and/or sensors 22, 24 so that they are part of a single packaged module or unit, or it is possible for the module 26 to be combined with any of the modules 28-32.

Vehicle communications module 28 provides the vehicle with short range and/or long range wireless communication capabilities so that the vehicle can communicate and exchange data with various devices, including personal electronic device 16, for example. For instance, vehicle communications module 28 may include a short range wireless circuit that enables short range wireless communications with device 16 and any number of other nearby devices (e.g., Bluetooth™, other IEEE 802.15 communications, Wi-Fi™, other IEEE 802.11 communications, vehicle-to-vehicle communications, etc.). Module 28 may also include a cellular chipset and/or a vehicle telematics unit that enables long range wireless communications with a back-end facility, a cloud-based facility or other remotely located entity (e.g., cellular, telematics communications, etc.). According to one non-limiting example, the vehicle communications module 28 includes the processing and memory devices 50, 52 mentioned above, a short range wireless circuit, a long range wireless circuit in the form of a cellular chipset, and one or more antenna(s) 54. Vehicle communications module 28 is indirectly or directly connected to the vehicle camera 20 and vehicle sensors 22, 24, as well as any combination of the other modules 26, 30, 32 (e.g., via vehicle communications network 40). It is possible for module 28 to be integrated or combined with any of the modules 26, 30, 32.

Vehicle autonomous driving module 30 is an optional component and provides the vehicle with autonomous and/or semi-autonomous driving capabilities and, depending on the particular embodiment, may be a single module or unit or a combination of modules or units. For instance, module 30 may include the following sub-modules (whether they be hardware, software or both): a perception sub-module, a localization sub-module and/or a navigation sub-module. The particular arrangement, configuration and/or architecture of the vehicle autonomous driving module 30 is not important, so long as the module helps enable the vehicle to carry out autonomous and/or semi-autonomous driving functions. Vehicle autonomous driving module 30 is indirectly or directly connected to the vehicle camera 20 and vehicle sensors 22, 24, as well as any combination of the other modules 26, 28, 32 (e.g., via vehicle communications network 40). It is possible for module 30 to be integrated or combined with any of the modules 26, 28, 32 or, in the alternative, for module 30 to be omitted altogether (as mentioned above, this is an optional component).

Vehicle electronic modules 32 may include any other suitable modules needed to help implement the present method. For instance, module 32 may include any combination of an infotainment module, a powertrain control module (PCM), an engine control module (ECM), a transmission control module (TCM), a body control module (BCM), a traction control or stability control module, a cruise control module, a steering control module, a brake control module, etc. As with the previous modules, vehicle control module 32 may be indirectly or directly connected to the vehicle camera 20 and vehicle sensors 22, 24, as well as any combination of the other modules 26-30 (e.g., via vehicle communications network 40). It is possible for module 32 to be integrated or combined with any of the modules 26-30.

Figure 2:
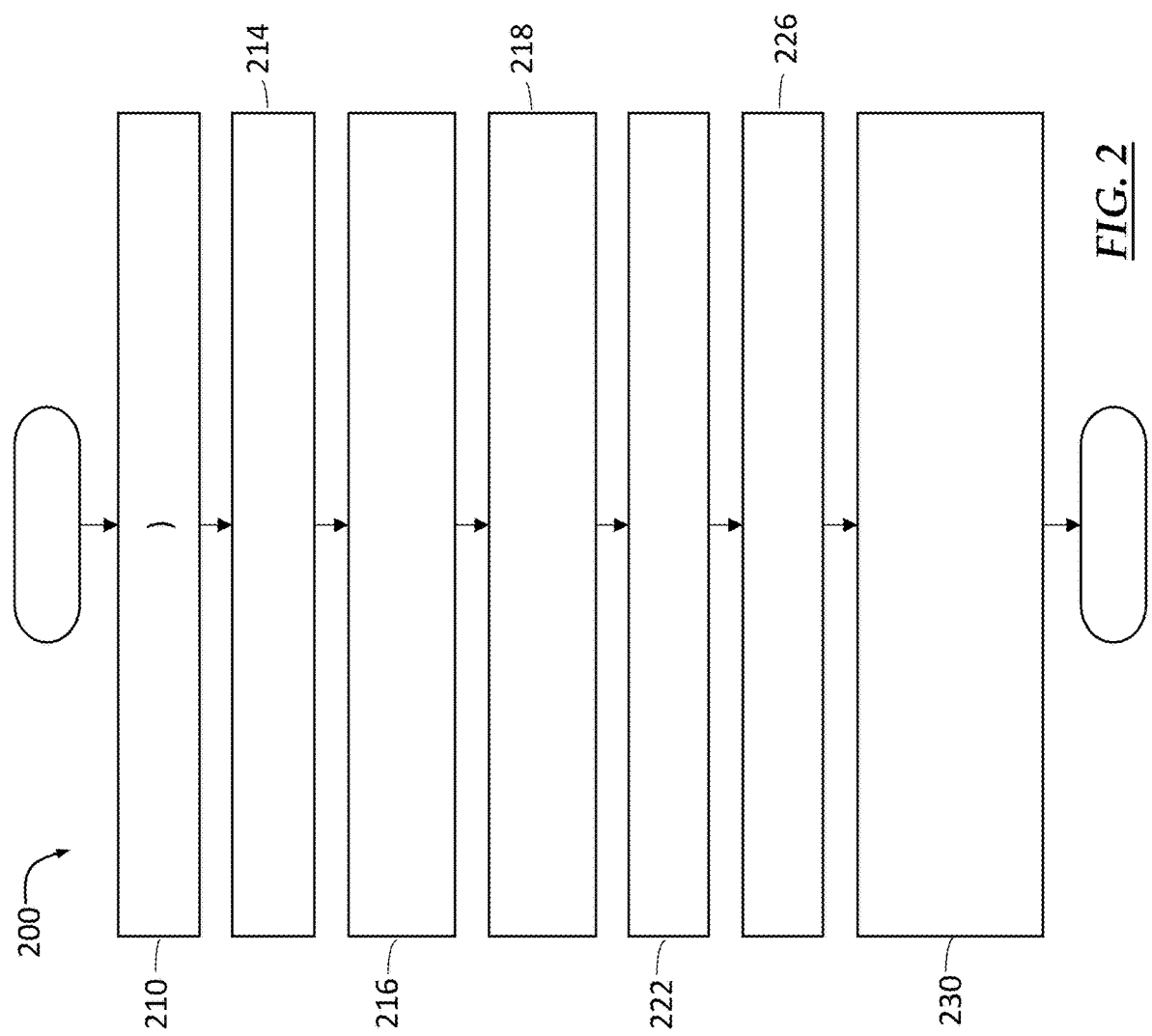
FIG. 2 is a flowchart depicting an embodiment of an interactive driving method that may be used with the interactive driving system of FIG. 1.

Turning now to the flowchart of FIG. 2, there is shown an example of the interactive driving method 200, where a passenger is presented with an augmented reality interface on their personal electronic device 16 that enables him or her to provide real-time input or observations regarding the driving experience. The augmented reality interface may utilize vehicle video data and vehicle sensor data to provide an entertaining game-like interface for the passenger that mimics, replicates and/or otherwise represents the driving conditions being experienced by the driver. In this way, the passenger is able to provide real-time passenger input (i.e., the passenger acts as a "pseudo-sensor") and to be entertained at the same time. The passenger input is then recorded with contemporaneous vehicle data and/or external data, for later processing and analysis. In the example of a traditional non-autonomous vehicle, the passenger input may be used to generate driving reports or scene reconstructions for later review by the driver and passenger (e.g., when a passenger is training a new driver or trying to teach a driver to drive more safely). In the example of an autonomous vehicle, the passenger input may be used to generate driving reports for the manufacturer (e.g., in the form of actionable feedback that can then be used to improve the various self-driving algorithms employed by the manufacturer). Numerous other embodiments are possible.

Beginning with step 210, the method gathers and provides vehicle video data.

For instance, step 210 may use one or more vehicle camera(s) 20 mounted on the vehicle to gather raw or heavy vehicle video data, and provide such data to vehicle data processing module 26, vehicle communications module 28 and/or some other component. The vehicle video data may include a raw video sequence containing numerous individual images or frames, or it may be provided according to some other video format. It is preferable that the vehicle video data be oriented in accordance with and be representative of the actual scene or conditions being experienced by the driver (e.g., the vehicle video data may include forward-looking video footage of an area in front of vehicle 10). Once the vehicle video data is gathered and provided, the method may proceed to step 214.

In step 214, the method gathers and provides vehicle sensor data in any variety of different forms. According to one embodiment, step 214 gathers various types of vehicle sensor data from vehicle sensors 22, 24 and provides such data to vehicle data processing module 26, vehicle communications module 28 and/or some other component. The vehicle sensor data may be used to help build or enhance the augmented reality interface that will be presented to the passenger. For example, it may be desirable for the augmented reality interface to not only present forward-looking video footage, but also to overlay such footage with certain vehicle dynamics sensor data, such as information regarding vehicle location, vehicle speed, vehicle acceleration, vehicle stability reading (e.g., wheel slippage, loss of traction) and/or some other vehicle operating parameter. According to one embodiment, the method gathers vehicle dynamics sensor data from vehicle sensor 22 in the form of vehicle location information (e.g., GPS coordinates), vehicle speed information, vehicle acceleration information and/or vehicle stability readings at the same time the method gathers vehicle video data from vehicle camera 20; this enables images from the camera to be correlated to the particular location, speed, acceleration and/or stability conditions of the vehicle at that time.

In another example, step 214 gathers vehicle external sensor data to be used in generating the augmented reality interface. Non-limiting examples of such vehicle external data include: a relative distance (e.g., a gap between vehicle 10 and a leading vehicle or other object), a relative speed (e.g., a speed differential between vehicle 10 and a leading vehicle or other object), a relative acceleration (e.g., an acceleration differential between vehicle 10 and a leading vehicle or other object) and/or some other vehicle external data. The vehicle external sensor data may be gathered from vehicle sensor 24. By presenting this information with the video footage, for example, the augmented reality interface can convey a more complete picture of the driving conditions being experienced by the driver, so that the passenger input can take such conditions into account. Any suitable combination of vehicle dynamics sensor data from sensor 22, vehicle external sensor data from sensor 24 and/or other sensor data may be used.

Next, the vehicle video data and the vehicle sensor data are sent to the personal electronic device 16 and used to create the augmented reality interface. However, the exact order or sequence of these steps may vary. For example, it is possible for the method to first process the vehicle video and sensor data at the vehicle 10 (e.g., at the vehicle data processing module 26) before sending it to the personal electronic device 16. In a different example, the method first sends the vehicle video and sensor data to the personal electronic device 16, so that the primary processing of the data can occur at the personal electronic device instead of at the vehicle 10. In yet another example, the processing of the vehicle video and sensor data is divided so that some processing tasks are allocated to the vehicle 10 and other processing tasks are allocated to the personal electronic device 16. The following description of steps 216 and 218 is provided in the context of first sending the vehicle video and sensor data from the vehicle 10 to the personal electronic device 16, and then carrying out the bulk of the processing needed to create the augmented reality interface at the personal electronic device; but the present method is not limited to this sequence, as explained above. The term "processing," as it is specifically used with steps 216 and 218, broadly includes any type of compressing, extracting, conditioning, synthesizing, blending, joining and/or other modifying that is used to put vehicle video data and/or vehicle sensor data into a form that can be incorporated into the augmented reality interface. This definition only applies to that term in the context of steps 216 and 218; other uses of the term "processing" should be given their normal meaning, as understood by those skilled in the art.

Turning now to step 216, the method sends some combination of vehicle video data and/or vehicle sensor data to the personal electronic device 16, where it can be used to produce the augmented reality interface. According to one possible embodiment, step 216 wirelessly sends the vehicle video and sensor data from the vehicle communications module 28 to the personal electronic device 16 over a short range wireless link 60. In another embodiment, which assumes that the personal electronic device 16 is physically connected to the vehicle 10 via some type of connection or port, step 216 sends the vehicle video and sensor data to the personal electronic device over a wired connection that utilizes vehicle communication network 40. In yet another embodiment, step 216 wirelessly sends the vehicle video and sensor data from the vehicle communications module 28 to a cloud-based facility over a long range wireless link, and then wirelessly sends such data from the cloud-based facility to the personal electronic device 16 over a long range wireless link. To reduce system latency or otherwise speed up this step, it is possible for the vehicle data processing module 26 and/or vehicle communications module 28 to preemptively process the data before it is sent to the personal electronics device 16, such as by down sampling the data, compressing the data, identifying and extracting certain features from the data, as well as any other technique that reduces the amount of data being transferred. It may be desirable to send the vehicle video and sensor data separately such that the different data streams are isolated from one another.

In step 218, the method uses the vehicle video data and the vehicle sensor data to create an augmented reality interface and to present it to the passenger. The augmented reality interface is an interactive tool that allows the passenger to monitor the driving in real-time, to evaluate the driving, and to provide passenger input (positive and/or negative) that can be used later to generate various types of driving reports. According to one embodiment, the augmented reality interface is created and carried out, at least in part, by a computer program product (e.g., a software "app") that is configured for installation on the personal electronic device 16 and includes electronic instructions that, when executed by the personal electronic device, cause the personal electronic device to perform a series of steps. In one example, the series of steps performed by the personal electronic device includes: creating an augmented reality interface using the vehicle video data and the vehicle sensor data, receiving passenger input via the augmented reality interface, and saving the passenger input, as described herein. The computer program product may be configured to communicate with the vehicle hardware 14. Non-limiting examples of how an augmented reality interface 300 may be created and presented are shown in FIGS. 3A-3B, which are illustrated screen shots of such an interface.

Starting with FIG. 3A, there is shown a screen shot of the augmented reality interface 300, where vehicle sensor data 310 has been overlaid or superimposed on vehicle video data 312 so that the passenger is presented with actual video footage that has been augmented with other relevant information. In this particular example, vehicle sensor data 310 includes information 320 pertaining to a vehicle location (here, it shows the vehicle is approaching an entrance to Route 60 in 400 m) and information 322 pertaining to a vehicle speed (79 km/hour), as well as other pieces of information 324 relating to various vehicle parameters. These pieces of information may be obtained from vehicle sensors 22. Since the augmented reality interface 300 is designed to give the passenger a complete sense of what the driver is experiencing so as to elicit useful passenger input, the vehicle sensor data 310 is superimposed on the vehicle video data 312 in a manner that does not block or obstruct the passenger's view of the area in front of the vehicle (e.g., the vehicle sensor data 310 is located towards the bottom of the screen and is somewhat transparent), but still gives the passenger access to pertinent vehicle information.

With reference to FIG. 3B, there is shown another screen shot of how the augmented reality interface 300 may be generated and presented to the passenger. In this case, the method has provided vehicle sensor data 310 in the form of an animation 330 which pertains to how close and/or how rapidly the vehicle 10 is approaching a parked vehicle 332, as well as a numerical indication 334 of that distance. The animation 330 may use different colors and or flashing graphics to convey a sense of the urgency involved with the current driving conditions. For instance, in FIG. 3B, the area between the parked vehicle 332 and the host vehicle 10 may be animated with graphics 330 that transition from green to yellow to red based on the relative distance between the vehicles, or that go from being a solid presentation to a flashing one. In addition, the augmented reality interface 300 may provide a numerical indication 334 of the distance between the vehicles (e.g., a 25 m gap) or some other piece of useful information. The vehicle external sensor data used to generate the vehicle sensor data 310 may be obtained from vehicle sensors 22 and/or 24 or it may be obtained from a vehicle module 26-32 (e.g., a vehicle collision avoidance module). In one example, the augmented reality interface 300 uses a default or standard presentation under normal conditions (e.g., the presentation shown in FIG. 3A), but transitions to a different presentation when a potentially problematic obstruction is detected in the path of vehicle 10 (e.g., the presentation shown in FIG. 3B). Other factors, like the vehicle stability readings, road surfaces, weather conditions, etc. may also be taken into account and used during the creation of the augmented reality interface 300. In both FIGS. 3A and 3B, it is preferable that the vehicle video data 312 represent the forward-looking orientation of the vehicle 10, and not the orientation of the personal electronic device 16.

Once the augmented reality interface is generated and presented to the passenger, the method receives passenger input via the augmented reality interface, step 222. It should be appreciated that there are any number of different ways for passenger input to be provided to the system via augmented reality interface 300, any combination of which may be used. For example, the passenger may provide real-time feedback to the system by using positive and negative indicators (e.g., thumbs-up or thumbs-down) to convey his or her opinion on a driving maneuver. Consider the example of FIG. 3B where the host vehicle 10 is approaching a vehicle 332 that is parked in the same lane. In this example, the passenger who is monitoring the current driving conditions via the augmented reality interface 300 may comment on the driver's performance by assigning either a thumbs-up or a thumbs-down rating when the driver swerves or otherwise changes lanes to avoid the parked vehicle. If the driver changes lanes well ahead of time in a manner that is both safe and comfortable, the passenger may assign a thumbs-up to this maneuver, so that both the driving conditions and the thumbs-up rating are saved for later processing. If, on the other hand, the driver waits to the last minute and swerves to miss the parked vehicle 332, the passenger may voice their disapproval of the driving maneuver by assigning a thumbs-down rating. In addition to or in lieu of the thumbs-up and thumbs-down input, the passenger may also provide passenger input regarding stopping distances, headway distances, driving maneuver speeds, the use of certain sensors or equipment (e.g., Advanced Driver Assistance System (ADAS) sensors like those directed to lane departure, forward collision, adaptive cruise control, turn signals, headlight high beams, etc.). For example, if the driver brings the vehicle to a stop, the passenger may provide input on the driver's stopping distance, a preferred stopping distance, the activation or use of certain ADAS sensors, or some other type of input that could be used in place of or in conjunction with a thumbs-up or thumbs-down rating. Such input constitutes a more complete passenger evaluation of that driving maneuver and can be useful later on if the passenger is attempting to teach the driver how to drive more safely. Numerous other examples of how such passenger input may be gathered and/or used are possible.

In one of the preceding examples, the passenger provides one of a number of predetermined ratings (in the case of thumbs-up and thumbs-down ratings, one of two ratings) to a driving maneuver, and may do so by entering the rating on the screen of the personal electronic device 16. The method may assign passenger input to a corresponding driving maneuver based on temporal-based factors (e.g., the method assumes that any passenger input provided within a certain amount of time of a driving maneuver, like a lane change, is intended to apply to that driving maneuver) or based on location-based factors (e.g., if the passenger makes a thumbs-up selection by touching the screen in FIG. 3B at the location of the animated area 330 behind the parked vehicle 332, the method assumes that the passenger input applies to the corresponding lane change). The passenger may provide his or her input in terms of multiple choice, free form entry, or according to some other data input format. In another example, the passenger may provide passenger input implicitly by identifying certain items during the trip, like stop or yield signs, so that the driver's performance can be subsequently compared to the passenger input (e.g., did the driver stop at all of the stop signs identified by the passenger, was each stop a full stop, what was the driver's stopping distance, etc.). Regardless of the exact way in which passenger input is received, the method uses the passenger as a pseudo-sensor to provide valuable, real-time input in a manner that only humans can sometimes provide. It may be desirable to limit or avoid a real-time communication channel between the passenger and driver, so as to avoid distracting the driver while he or she is driving.

In step 226, the method stores or saves the current driving conditions and the corresponding passenger input. Skilled artisans will appreciate that any number of different techniques may be used to store the aforementioned information in the most efficient and economical way possible. For instance, when a passenger provides passenger input regarding a particular driving maneuver, the method may save a contemporaneous video image or frame, a contemporaneous segment of video footage (e.g., five seconds of video footage before and five seconds of footage after a thumbs-up was given for a total of ten seconds of contemporaneous video footage), as well as contemporaneous vehicle sensor data. A purpose for saving such contemporaneous information is so that when the driving maneuver is subsequently assessed or reviewed, the circumstances surrounding the driving maneuver can be taken into account along with the passenger input. This step may employ any suitable data storage, video caching and/or other information storing techniques known in the art, including those where some combination of vehicle video and sensor data, along with passenger input, is saved at a database housed at the personal electronic device 16, the vehicle 10 and/or some cloud-based facility.

Figure 4B:
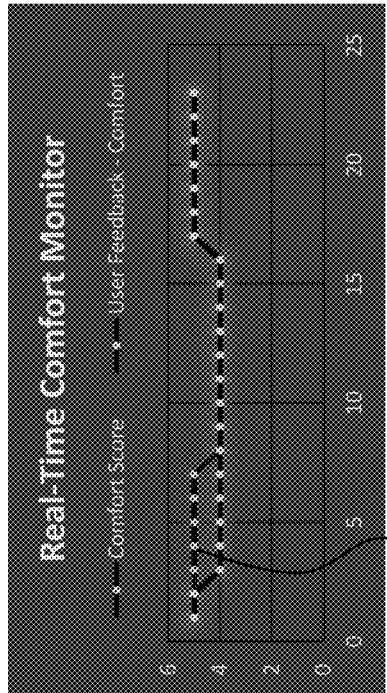
FIGS. 4A-4B are examples of driving reports that may be generated by the interactive driving method of FIG. 2.
Figure 4A:
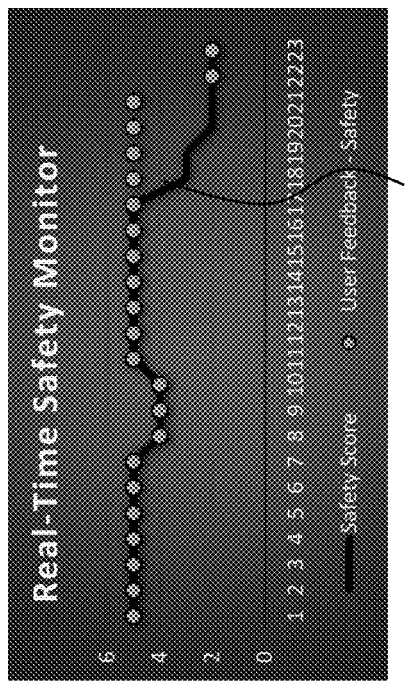

The method then generates one or more driving reports based on the passenger input, step 230. The driving reports may be provided in any number of different formats, depending on the application for which they are used. To illustrate, consider a traditional non-autonomous vehicle where a passenger is teaching a new driver how to drive or is working with a driver to improve the safety of his or her driving. In this example, after the new driver has completed the trip, step 230 may provide a post-trip driving report for the passenger and new driver to review together. FIGS. 4A and 4B show two non-limiting examples of such driving reports, where driving report 400 in FIG. 4A pertains to a safety score 410 (i.e., a score representative of how safely the driver performed, based on one or more driving maneuvers commented on by the passenger) and driving report 402 in FIG. 4B pertains to a comfort score 412 (i.e., a score representative of how comfortably or smoothly the driver performed, based on one or more driving maneuvers graded by the passenger). In addition, the driving reports may include saved examples of actual driving maneuvers—complete with contemporaneous video footage, camera images, vehicle sensor data and/or passenger input—so that the passenger and driver can discuss actual driving situations that occurred and do so in sufficient detail.

In the context of an autonomous or semi-autonomous vehicle example where the passenger input pertains to driving maneuvers automatically carried out by an autonomous driving system, step 230 may provide driving reports to the vehicle manufacturer or some other entity so that improvements can be made to various autonomous driving algorithms, etc. This may be particularly useful in the case of a fleet of autonomous or semi-autonomous vehicles, where numerous passengers are providing feedback on autonomous driving styles they like and dislike so that actionable improvements can be made to the way such vehicles are driven. Skilled artisans will know of various data analysis techniques for identifying and/or determining such actionable improvements, any one of which may be used. Some techniques may look to optimize comfort and safety ratings so that optimal or at least popular driving styles emerge, which in turn can be used to make adjustments or calibrations to relevant autonomous driving algorithms. The driving reports, whether they be in the context of autonomous or non-autonomous systems, may be delivered electronically or otherwise (e.g., emailed or sent to pre-selected electronic device) and may be limited to the most recent trip or they may be cumulative of a number of previous trips, to cite several possibilities.

According to a different embodiment, some changes or modifications are made to the interactive driving method previously described so that it is more game-like and entertaining. In this embodiment, the method may score or otherwise track the virtual driving decisions made by the player (i.e., the passenger), as well as other metrics, such as when those decisions are made. Considering the screen shot from FIG. 3B, if the method is in a game mode, the method may assign a certain number of points for slowing down and/or changing lanes to avoid the parked vehicle 332, and the number of points assigned can be based on the timing of the decisions (e.g., more points are awarded if the passenger slows down and makes the lane change an appropriate distance behind the parked vehicle versus waiting until the host vehicle is right behind the parked vehicle). In a sense, the game mode seeks to capitalize on "teaching moments" by creating an entertaining and interactive environment for the passenger to experience on their own personal electronic device 16. Safety and comfort, in terms of virtual driving decisions or maneuvers, are two areas where the game mode may look to score the player and may do so according to collision prediction or comfort modules. According to one embodiment, which is illustrated in FIGS. 4A and 4B, the method may provide a safety or comfort score 410, 412 for the actual driver of the vehicle, as well as a corresponding safety or comfort score 420, 422 for the player who is playing the game and inputting virtual driving decisions.

The game mode may be enhanced with any number of features, such as by providing a simulation mode, where various types of hypothetical obstacles or scenarios can be presented to the player via the augmented reality interface. For instance, in the augmented reality interface 300, hypothetical or virtual jay walkers, additional vehicles, obstacles, etc. could be introduced to the interface and presented to the player so that he or she has to make a quick decision in terms of the best way to react. These types of "what if" scenarios can be selected based on the player's ability level, age or past driving performance, for example, and can be scored or graded in a similar was as explained above. Other modifications or improvements to the augmented reality interface and/or the game mode are certainly possible.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. An interactive driving method for use with a vehicle having one or more vehicle camera(s) and one or more vehicle sensor(s), the method comprising the steps:

gathering vehicle video data with the vehicle camera(s);
gathering vehicle sensor data with the vehicle sensor(s);
sending the vehicle video data and the vehicle sensor data from the vehicle to a personal electronics device;
creating an augmented reality interface using the vehicle video data and the vehicle sensor data, the augmented reality interface gives a passenger a sense of the driving conditions currently being experienced;
receiving passenger input via the augmented reality interface in the form of a predetermined positive indicator or a predetermined negative indicator, wherein a positive indicator represents a positive evaluation of a driving maneuver by the passenger and a negative indicator represents a negative evaluation of a driving maneuver by the passenger, and wherein the receiving step further comprises determining an amount of time between the driving maneuver and the passenger inputting the predetermined positive indicator or the predetermined negative indicator, and using the amount of time as a temporal-based factor to assign the predetermined positive indicator or the predetermine negative indicator to the driving maneuver; and saving the passenger input.

2. The method of claim 1, wherein the vehicle video data gathering step further comprises gathering vehicle video data in the form of forward-looking video footage, the forward-looking video footage captures an area in front of the vehicle and is representative of an actual scene or set of conditions being experienced by a driver.

3. The method of claim 1, wherein the vehicle sensor data gathering step further comprises gathering vehicle sensor data in the form of vehicle dynamics sensor data that can be used to enhance the augmented reality interface, the vehicle dynamics sensor data is selected from a list consisting of: a vehicle location, a vehicle speed, a vehicle acceleration, or a vehicle stability reading.

4. The method of claim 1, wherein the vehicle sensor data gathering step further comprises gathering vehicle sensor data in the form of vehicle external sensor data that can be used to enhance the augmented reality interface, the vehicle external sensor data is selected from a list consisting of: a relative distance, a relative speed, or a relative acceleration between the vehicle and another vehicle or object.

5. The method of claim 1, wherein the sending step further comprises sending the vehicle video data and the vehicle sensor data from a vehicle communications module on the vehicle to the personal electronics device over a short range wireless link.

6. The method of claim 1, wherein the sending step further comprises sending the vehicle video data and the vehicle sensor data from a vehicle communications module on the vehicle to a cloud-based facility over a long range wireless link, and then sending the vehicle video data and the vehicle sensor data from the cloud-based facility to the personal electronics device over a long range wireless link.

7. The method of claim 1, wherein the creating step further comprises creating the augmented reality interface by overlaying or superimposing the vehicle sensor data on top of the vehicle video data.

8. The method of claim 7, wherein the vehicle sensor data includes vehicle dynamics sensor information, the vehicle video data includes actual video footage of an area in front of the vehicle, and the vehicle sensor data is overlaid or superimposed on the vehicle video data so that the augmented reality interface presents both the vehicle sensor data and the vehicle video data to the passenger at the same time.

9. The method of claim 7, wherein the vehicle sensor data includes vehicle external sensor information, the vehicle video data includes actual video footage of an area in front of the vehicle, and the vehicle sensor data is animated so that the augmented reality interface presents both the vehicle sensor data and the vehicle video data to the passenger in a way that changes with an urgency of the driving conditions being experienced by a driver.

10. The method of claim 9, wherein the animated vehicle sensor data includes at least one of a changing color or a changing graphic to convey the urgency of the driving conditions being experienced by a driver.

11. The method of claim 1, wherein the creating step further comprises using a computer program product configured for installation on the personal electronics device to create the augmented reality interface, the computer program product includes electronic instructions that, when executed by the personal electronics device, cause the personal electronics device to present the augmented reality interface to the passenger via a screen or display on the personal electronics device.

12. The method of claim 1, wherein the receiving step further comprises determining a relationship on a screen of the personal electronics device between a location where the driving maneuver occurs and a location where the passenger inputs the predetermined positive and negative indicators, and using the relationship as a location-based factor to assign the predetermined positive and negative indicators to the driving maneuver.

13. The method of claim 1, wherein the saving step further comprises saving the passenger input along with contemporaneous vehicle video data and vehicle sensor data.

14. The method of claim 1, further comprising the step of:
generating a driving report from the saved passenger input.

15. The method of claim 14, wherein the driving report includes a post-trip driving report for the passenger and driver to review together, the post-trip driving report includes at least one of a safety score or a comfort score.

16. The method of claim 14, wherein the driving report includes one or more saved example(s) of actual driving maneuvers, the saved example(s) include at least one of saved video footage, a saved camera image, or saved vehicle sensor data.

17. The method of claim 1, wherein the augmented reality interface is in a game mode, and the method further comprises the step of:
scoring the passenger based on virtual driving decisions that are part of the passenger input.

18. An interactive driving method for use with a vehicle having one or more vehicle camera(s) and one or more vehicle sensor(s), the method comprising the steps:
gathering vehicle video data with the vehicle camera(s);
gathering vehicle sensor data with the vehicle sensor(s);
sending the vehicle video data and the vehicle sensor data from the vehicle to a personal electronics device;
creating an augmented reality interface using the vehicle video data and the vehicle sensor data, the augmented reality interface gives a passenger a sense of the driving conditions currently being experienced;
receiving passenger input via the augmented reality interface;
saving the passenger input;
generating a driving report from the saved passenger input, wherein the driving report includes feedback for an autonomous driving system; and
making adjustments or calibrations to autonomous driving algorithms based on the saved passenger input in the driving report.

19. An interactive driving method for use with a vehicle having one or more vehicle camera(s) and one or more vehicle sensor(s), the method comprising the steps:
gathering vehicle video data with the vehicle camera(s);
gathering vehicle sensor data with the vehicle sensor(s);
sending the vehicle video data and the vehicle sensor data from the vehicle to a personal electronics device;
creating an augmented reality interface using the vehicle video data and the vehicle sensor data, the augmented reality interface gives a passenger a sense of the driving conditions currently being experienced, and the augmented reality interface is in a game mode;
receiving passenger input via the augmented reality interface;
saving the passenger input;

scoring the passenger based on virtual driving decisions that are part of the passenger input, wherein the game mode includes a simulation feature; and presenting one or more hypothetical obstacles or scenarios to the passenger via the augmented reality interface that are not actually being experienced by a driver.

* * * * *